Aug. 6, 1946. A. R. LINDSAY 2,405,262
SPLASH GUARD FOR VEHICLES, ESPECIALLY TRUCKS
Filed Dec. 3, 1943
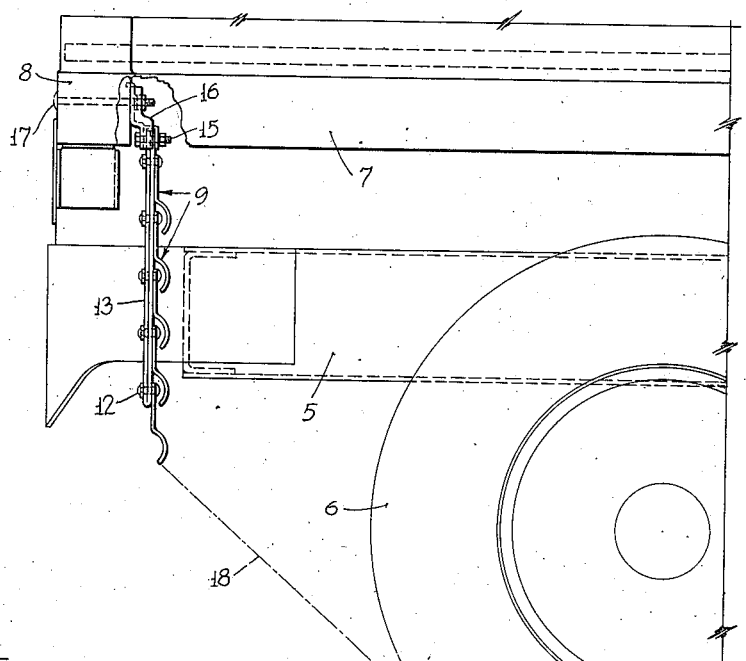
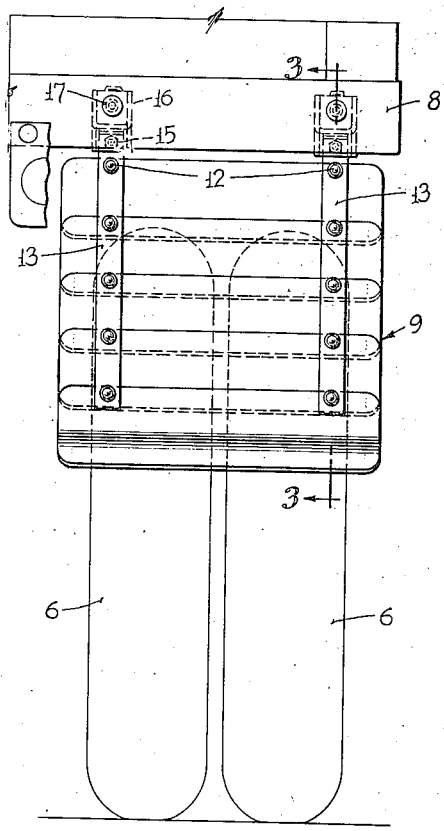
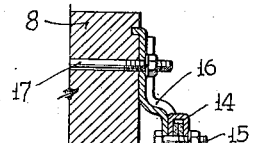
INVENTOR
Alexander R. Lindsay,
BY John P. Tarbox
ATTORNEY Patented Aug. 6, 1946

2,405,262

UNITED STATES PATENT OFFICE 2,405,262

SPLASH GUARD FOR VEHICLES, ESPECIALLY TRUCKS

Alexander R. Lindsay, Detroit, Mich., assignor to Edward G. Budd Manufacturing Company, Philadelphia, Pa., a corporation of Pennsylvania Application December 3, 1943, Serial No. 512,722

3 Claims. (Cl. 280—153)

1

The invention refers to a splash guard for vehicles and more particularly to a splash guard for trucks and other vehicles which are subjected to severe and rough use.

Among the objects of the invention is a splash guard which affords, on the one hand, the same or better protection than the splash guards hitherto used for the same type of vehicles, and which on the other hand, is better fitted to withstand the rough treatment to which they are subjected, especially when attached to military vehicles, such as trucks, troop carriers, and others.

Splash guards for vehicles of the indicated type consist mostly of a heavy substantially rigid metal shield which is attached to the chassis or body and which is additionally held in place and reinforced by braces. These guards get easily bent, torn off or otherwise damaged when they come in contact with an obstacle, such as with a loading platform against which the vehicle is backed up.

The aforesaid objects of the invention are achieved and the outlined disadvantages overcome by a splash guard consisting of flexibly interconnected flat slabs, preferably of sheet steel.

The new flexible splash guard is attached at its upper margin to the vehicle body and is held in substantially vertical position by its own weight. If this guard hits an obstacle, it gives way without being deformed or torn off. The protection against mud may even be better than with the old-type rigid guards because the flexible guard may extend beyond the clearance line limiting the extent of the rigid guards.

More particularly, the new guard consists of elongated slabs which overlap one another by marginal portions and which are interconnected and suspended from the vehicle structure by flexible means, such as by a plurality of fabric bands or straps.

An embodiment of the invention is illustrated in the attached drawing and described in the following.

In the drawing:

Figure 1 is a fragmentary diagrammatic side elevation of the rear lower corner of a truck;

Figure 2 is a fragmentary rear view of the same corner; and

Figure 3 is a vertical section on a larger scale through the splash guard and sill supporting it along line 3—3 of Figure 2.

The illustrated truck comprises a chassis frame 5, dual rear wheels 6 and a body 7 supported by the chassis and comprising a rear transverse sill 8. Five identically shaped slabs 9 each have a

2 substantially plane portion 10 and a beaded lower marginal portion 11. These slabs are secured by means of two rivets 12 each, to two flexible straps or strips 13. These straps or strips may consist of ribbed heavy duty material and may be treated so as to prevent decay. In the embodiment the straps each consist of two layers which may be stitched together along their margins. The beaded portions 11 overlap the adjacent margin of the next lower slab and cover the rivets thereof.

The upper ends of the bands or straps 13 are secured by means of clips 14 and bolts and nuts 15 to brackets 16 which engage and are secured by bolts and nuts 17 to the front side of the body sill 8.

Line 18 indicates the tangent connecting the lower edge of the new splash guard with the circumference of the wheel and gives an idea of the amount of protection afforded by the guard. This line is considerably lower than the corresponding tangent line on vehicles of the same general description having rigid splash guards.

The invention is not restricted to the described and illustrated embodiment but many modifications will easily occur to those skilled in the art, such as in regard to the form and material of the slabs and their connection to the straps, in regard to the connection of the straps to the sill or other vehicle members and so on. Indeed, other means than straps may be provided for flexibly interconnecting the slabs and for suspending the latter from the vehicle structure. All such modifications are intended to be covered by the attached claims.

What is claimed is:

1. Splash guard for vehicles comprising a plurality of elongated substantially flat slabs, said slabs having one of their margins beaded, means in the form of straps extending transversely to the longitudinal extent of the slabs, connecting means between the unbeaded margins of the slabs and said straps, the beaded margins of the slabs overlapping and covering said connecting means, the unit formed by said slabs and said straps being adapted for suspension from a vehicle structure.

2. Splash guard for vehicles comprising a plurality of substantially flat slabs, said slabs having one of their margins beaded, flexible means extending across said slabs on one side thereof, connecting means between the unbeaded margins of the slabs and said flexible means, the beaded margins of the slabs overlapping and covering said connecting means, the unit so formed being adapted for suspension from a vehicle structure.

3. Splash guard for vehicles comprising a plurality of elongated substantially flat slabs arranged side by side with narrow marginal portions of adjoining slabs in overlapping relation, flexible strips of a width less than the length of the slabs extending transversely to said slabs and arranged on one side only of the latter, connecting means between one margin only of each of said slabs and said flexible strips and extending through the slabs and the strips so that the margin of an adjoining slab overlaps and hides from one side the connecting means, the so formed unit being adapted for suspension from a vehicle structure.

ALEXANDER R. LINDSAY.